July 23, 1935.  E. B. BOUGHTON ET AL  2,008,975
FLUID PRESSURE BRAKING SYSTEM
Filed Jan. 17, 1930  2 Sheets-Sheet 1
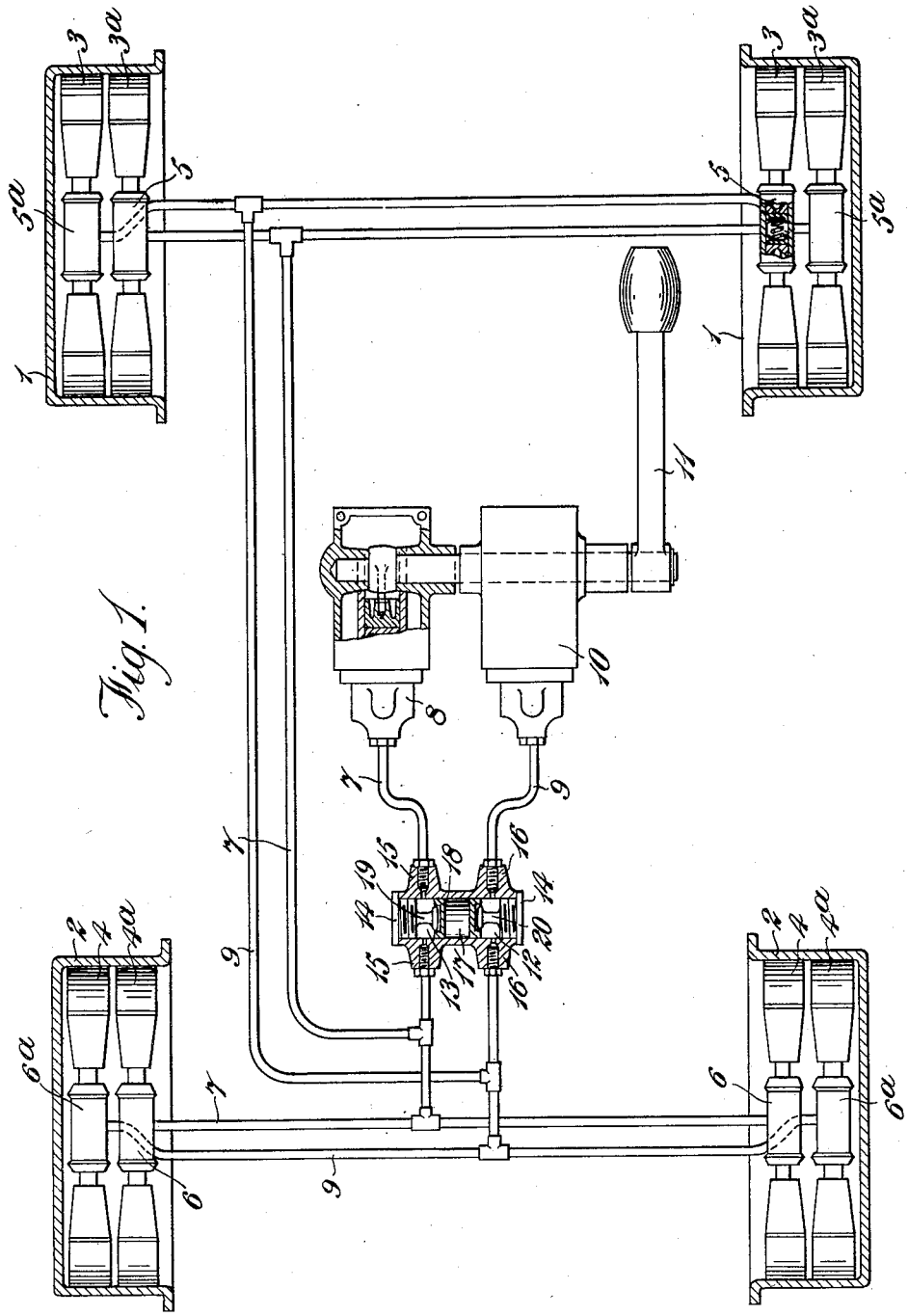
INVENTORS
E.B. BOUGHTON, W. EMMOTT AND D.T. BROCK
by
ATTY.

July 23, 1935. E. B. BOUGHTON ET AL 2,008,975
FLUID PRESSURE BRAKING SYSTEM
Filed Jan. 17, 1930 2 Sheets-Sheet 2
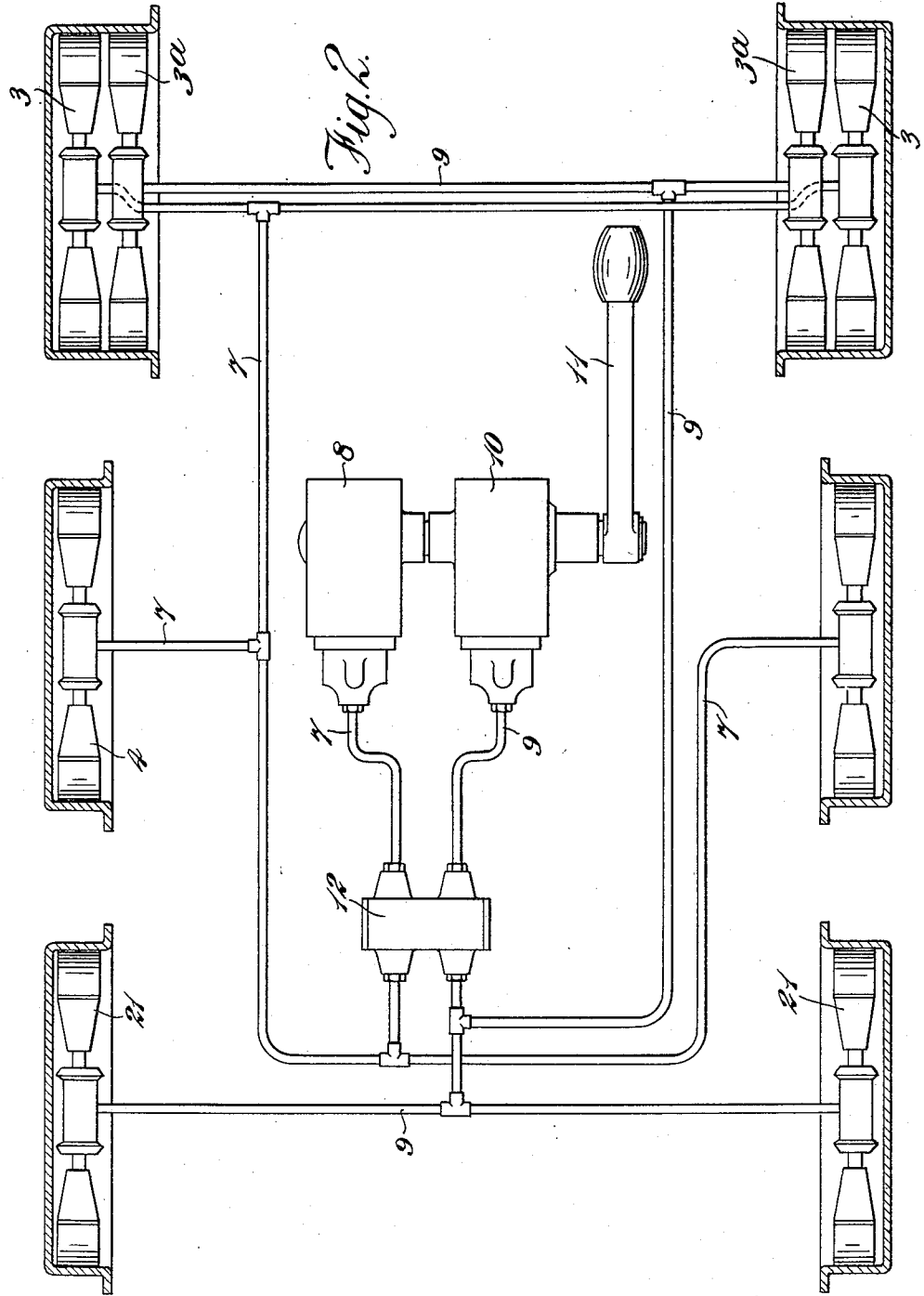
INVENTORS
E.B.BOUGHTON, W. EMMOTT AND D.T. BROCK
by
ATTY.

Patented July 23, 1935

2,008,975

UNITED STATES PATENT OFFICE 2,008,975

FLUID PRESSURE BRAKING SYSTEM

Edward Bishop Boughton, Willie Emmott, and Denis Tabor Brock, London, England, assignors to Automotive Products Company Limited, London, England Application January 17, 1930, Serial No. 421,492
In Great Britain January 25, 1929

5 Claims. (Cl. 188—152)

This invention relates to fluid pressure braking systems, particularly for motor vehicles, of the kind comprising separate systems each complete in itself and consisting of a pressure-producing unit or device communicating through a suitable fluid pressure pipe or system of pipes with pressure-operated means associated with the respective brakes to be applied, the separate pressure-producing units or devices being actuated by a common lever or other operating member and the separate systems being rendered normally interdependent as regards the fluid pressure therein by means adapted not only to ensure equal pressures in the systems but also that, should a defect occur in one of the systems to render the pressure fluid ineffective for applying the brakes, the other system or systems will remain operative.

In known braking systems of the kind referred to, two separate systems are employed, one operating only on the front pair of wheels and the other system operating only on the rear pair of wheels.

According to the present invention, in a fluid pressure braking system of the kind referred to, each separate system is arranged to operate brakes on more than one pair of wheels. Thus, in one arrangement, applicable more especially to a four-wheeled vehicle, two sets of brake shoes or of pressure-operated brake-actuating devices are associated with each wheel and the two separate fluid pressure systems are arranged so that one operates one set of brake shoes or of pressure-operated brake-actuating devices associated with all four wheels, while the other system operates the other set of brake shoes or pressure-operated brake-actuating devices of all four wheels.

In a modification as applied to a six-wheeled motor vehicle, one pair of wheels, preferably the front pair, is provided with two sets of brake shoes or of pressure-operated brake-actuating devices and each of the two separate fluid pressure systems is arranged to operate one of the sets of brake shoes or of pressure-operated brake-actuating devices associated with the two wheels, while, in addition, one system also operates the brakes on one pair of the remaining four wheels, and the other system operates the brakes on the other pair of the remaining four wheels.

The invention is hereinafter described by way of example with reference to the accompanying diagrammatic drawings, in which:—

Figure 1 is a diagrammatic plan view partly in section illustrating one embodiment of the invention; and Figure 2 is a similar view illustrating a modification.

In carrying the invention into effect according to one embodiment and in the application of the invention to a four-wheeled motor vehicle, as shown in Figure 1, each of the brake drums 1, 2 is provided with independent brake shoes or equivalent braking members 3, 3a and 4, 4a, and each brake shoe or the like has associated therewith a pressure-operated device 5, 6 and 5a, 6a respectively, each conveniently comprising an open-ended cylinder fitted with a pair of opposed pistons. A pair of pressure-producing units or devices 8, 10, is operated by a common lever or member 11. At a suitable intermediate position in the fluid pressure pipes 7, 9 or systems, a balancing or pressure-compensating device 12 is inserted. This device 12, consists of a hollow cylinder 13 closed at the ends by means of screwed plugs 14 or the like and provided adjacent each end with a pair of laterally extending bosses 15, 16 having screw-threaded holes communicating at their inner ends with the respective end of the cylinder 13 and adapted for connection with the respective pipe lines 7, 9 or systems. A single piston 17 having at each end an outwardly directed cup washer 18 or other suitable packing is provided in the cylinder 13 in an intermediate position and is capable of free movement therein within limits determined by fixed stops 19, 20 conveniently consisting of integral inwardly extending projections upon the screwed plugs 14 or closure members at the ends of the cylinder 13.

One of the pressure-producing units or devices, for instance 8, communicates, through the pressure pipe system 7, with one of the pressure-operated devices 5, 6 associated with the respective drums 1, 2, while the other pressure-producing unit or device 10 communicates, through the fluid pressure pipe system 9, with the other pressure-operated device 5a, 6a, so that two separate braking systems are provided, each operating upon all four wheels. It will be understood that, inasmuch as each set of four pressure-operated devices 5, 6, or 5a, 6a is connected to one pipe system 7 or 9 respectively, while the two systems 7, 9 are balanced by the balancing or pressure-compensating device 12 connected between them, all the brake shoes or the like will be applied substantially at the same pressure when the two systems are operating correctly under the control of the common brake lever or equivalent member 11. If, however, one of the systems should fail, it is evident that the other system will continue to operate under increased pressure upon the respective set of brake shoes or the like of the four wheels.

In the application of the invention to a six-wheeled vehicle and with reference to Figure 2 of the accompanying diagrammatic drawings, one system 7 may operate on one pair of brake shoes 3 of the front wheels and also on the brake shoes 4 of one pair of rear wheels, while the other system 9 operates on the other pair of brakes 3a of the front wheels and on the brake shoes 21 of the other pair of rear wheels. Thus, should either of the systems 7 or 9 fail, a braking effect is still obtained both on the front wheels and on one pair of rear wheels, the two systems being operated and interconnected by means such as before described.

It will be understood that the invention is not limited to the particular constructions hereinbefore described.

What we claim is:—

1. A fluid pressure braking system for four-wheeled vehicles including independent sets of brake shoes for each wheel, a fluid pressure system for operating the similar set of brake shoes of each wheel simultaneously, means directly and immediately responsive to relatively excess pressure in either fluid pressure system for equalizing the pressures in said systems, and a unit control for all systems.

2. The provision on a wheeled vehicle, of two independent hydraulic braking systems, each system including a plurality of brake elements distributed over at least four wheels of the vehicle, liquid pressure creating means, pipe lines operatively connecting said means with said braking elements, a liquid pressure equalizing device including a cylinder, a floating piston therein directly and immediately responsive to relatively excess pressure in either of said liquid pressure creating means, and means for connecting the cylinder at its respective ends with the respective pipe lines, whereby the pressure of the pipe lines will act upon opposed ends of the piston to adjust the latter in accordance with the pressure and thus maintain substantially equal the liquid pressure within said pipe lines, the pressure equalizing device operating under pressure in one system and failure of pressure in the other to effectively maintain a pressure in one of the systems and thus operate the brake elements connected to that system, and a single control lever coupled mechanically with the pressure creating means to simultaneously operate such means for the creation of pressure in the independent hydraulic braking systems.

3. In combination with a wheeled vehicle, completely independent sets of brake shoes for certain of opposing wheels, a fluid pressure system for the control of similar brake shoes of such wheels, independent pressure creating means for simultaneously and similarly operating each fluid pressure system, and means controlled by and directly responsive to variation in the pressures in the respective systems for maintaining pressures in the systems substantially equal and for preventing loss of pressure in either system incident to failure of pressure in the other of such systems.

4. A fluid pressure braking system for six-wheeled vehicles wherein each wheel of one pair of wheels is provided with two sets of brake shoes and wherein each wheel of the remaining pairs of wheels is provided with a single set of brake shoes, a fluid pressure means simultaneously controlling the brakes of one pair of wheels having a single set of brake shoes and one set of brake shoes of the wheels having two sets of brake shoes, a second fluid pressure means for simultaneously controlling the brakes of the remaining wheels having a single set of brake shoes and the remaining brake shoes of the wheels having two sets of brake shoes, and means for equalizing the pressures in said fluid pressure means.

5. A fluid pressure braking system for six-wheeled vehicles wherein each wheel of one pair of wheels is provided with two sets of brake shoes and wherein each wheel of the remaining pairs of wheels is provided with a single set of brake shoes, a fluid pressure means simultaneously controlling the brakes of one pair of wheels having a single set of brake shoes and one set of brake shoes of the wheels having two sets of brake shoes, a second fluid pressure means for simultaneously controlling the brakes of the remaining wheels having a single set of brake shoes and the remaining brake shoes of the wheels having two sets of brake shoes, means for equalizing the pressures in said fluid pressure means, and a unit control for both fluid pressure means.

EDWARD BISHOP BOUGHTON.
WILLIE EMMOTT.
DENIS TABOR BROCK.